(12) United States Patent
Jaquette

(10) Patent No.: US 12,047,492 B2
(45) Date of Patent: Jul. 23, 2024

(54) CRYPTO-ERASURE VIA INTERNAL AND/OR EXTERNAL ACTION

(71) Applicant: International Business Machines Corporation, Armonk, NY (US)

(72) Inventor: Glen Jaquette, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 132 days.

(21) Appl. No.: 16/808,174

(22) Filed: Mar. 3, 2020

(65) Prior Publication Data

US 2021/0083858 A1 Mar. 18, 2021

Related U.S. Application Data

(60) Provisional application No. 62/900,045, filed on Sep. 13, 2019.

(51) Int. Cl.
*H04L 9/08* (2006.01)
*H04L 9/14* (2006.01)

(52) U.S. Cl.
CPC .......... *H04L 9/0822* (2013.01); *H04L 9/0866* (2013.01); *H04L 9/0894* (2013.01); *H04L 9/14* (2013.01)

(58) Field of Classification Search
CPC .......... G06F 21/78; G06F 21/79; G06F 21/60; G06F 21/602; G06F 21/62; G06F 21/70; G06F 21/72; H04L 9/06; H04L 9/08; H04L 9/0866; H04L 9/0869; H04L 9/0822;
(Continued)

(56) References Cited

U.S. PATENT DOCUMENTS 5,940,507 A    8/1999   Cane et al.
6,363,480 B1   3/2002   Perlman
(Continued)

FOREIGN PATENT DOCUMENTS

CN    104881374 A    9/2015
CN    107547198 A    1/2018
(Continued)

OTHER PUBLICATIONS

International Search Report and Written Opinion from PCT Application No. PCT/IB2020/058194, dated Dec. 16, 2020.
(Continued)

*Primary Examiner* — Shaqueal D Wade-Wright
(74) *Attorney, Agent, or Firm* — Zilka-Kotab, P.C.

(57) ABSTRACT

Device-implemented methodology for enabling and/or performing crypto-erase via internal action and external action. In one illustrative aspect, a request to read data is received at a device configured to perform data operations on a storage medium, the data being stored on the storage medium in encrypted form. In one approach, a first key stored within the device is accessed. In another approach, a first key stored on and/or with the storage medium is retrieved. A second key is received from an external source. A media encryption key is generated using the first and second keys. The encrypted form of the data is read from the storage medium. The encrypted form of the data is decrypted using the media encryption key. The decrypted data is output. Methodology for writing encrypted data is also presented.

25 Claims, 10 Drawing Sheets

(58) Field of Classification Search
CPC ....... H04L 9/0894; H04L 9/0897; H04L 9/14; H04L 63/04; H04L 63/0428; H04L 63/0478
See application file for complete search history.

(56) References Cited

U.S. PATENT DOCUMENTS

| | | | |
|---|---|---|---|
| 8,813,247 B1* | 8/2014 | Alten | H04L 9/0822 726/28 |
| 9,594,698 B2 | 3/2017 | Koning et al. | |
| 9,720,700 B1 | 8/2017 | Brown et al. | |
| 10,205,594 B1* | 2/2019 | Kaufman | H04L 9/0822 |
| 11,093,627 B2* | 8/2021 | Hutchison | H04L 9/0662 |
| 2003/0046564 A1 | 3/2003 | Masuda et al. | |
| 2008/0141039 A1 | 6/2008 | Matze | |
| 2008/0294906 A1* | 11/2008 | Chang | H04L 9/3263 713/182 |
| 2009/0034722 A1* | 2/2009 | Zaharris | G11B 20/00086 380/44 |
| 2009/0175453 A1 | 7/2009 | Shinbori et al. | |
| 2009/0245522 A1 | 10/2009 | Kudo et al. | |
| 2009/0268902 A1* | 10/2009 | Fascenda | H04L 9/0897 380/44 |
| 2010/0058072 A1 | 3/2010 | Teow et al. | |
| 2011/0072276 A1* | 3/2011 | Lee | G06F 21/80 713/189 |
| 2013/0010966 A1 | 1/2013 | Li et al. | |
| 2014/0325235 A1 | 10/2014 | Thompson et al. | |
| 2015/0242657 A1* | 8/2015 | Kim | G06F 21/78 713/193 |
| 2015/0304108 A1 | 10/2015 | Obukhov et al. | |
| 2017/0372085 A1* | 12/2017 | Howe | H04L 9/0861 |
| 2019/0158281 A1* | 5/2019 | Han | H04L 9/0836 |
| 2020/0186342 A1* | 6/2020 | Zhang | H04L 9/3247 |
| 2022/0191019 A1* | 6/2022 | Jaquette | H04L 9/0861 |

FOREIGN PATENT DOCUMENTS

| | | |
|---|---|---|
| JP | 2011248859 A | 12/2011 |
| JP | 2012212294 A | 11/2012 |
| JP | 2018160919 A | 10/2018 |
| WO | 2018194634 A1 | 10/2018 |

OTHER PUBLICATIONS

Seagate, "Seagate Secure TCG Enterprise SSC Self-Encrypting Drives FIPS 140 Module Security Policy," Seagate Technology, Security Level 2, Rev 2.11, May 27, 2019, 29 pages.
Kissel et al., "Guidelines for Media Sanitization," NIST Special Publication 800-88, Revision 1, Dec. 2014, 64 pages.
Perlman, R., "The Ephemerizer: Making Data Disappear," Sun Microsystems, SMLI TR-2005-140, Feb. 2005, 20 pages.
TCG, "TCG Storage Security Subsystem Class: Enterprise," TCG, Specification Version 1.00 Final, Revision 3.00, Jan. 10, 2011, 90 pages.
Wikipedia, "Secret sharing," Wikipedia, last edited Feb. 2020, 8 pages, retrieved from https://en.wikipedia.org/wiki/Secret_sharing.
Tate et al., "Implementing the Storwize V7000 and the IBM System Storage SAN32B-E4 Encryption Switch," IBM Redbooks, specifically chapters 3 and 4, Feb. 2012, 262 pages.
Examination Report Response from European Application No. GB2204420.0, dated Aug. 3, 2023, 4 pages.
Examination Report from European Application No. GB2204420.0, dated Aug. 31, 2023.
Examination Report Response from European Application No. GB2204420.0, dated May 18, 2023.
Rejection Decision from Chinese Patent Application No. 202080062786.3, dated Apr. 15, 2023.
Office Action from Chinese Patent Application No. 202080062786.3, dated Oct. 26, 2022.
Examination Report from European Application No. GB2204420.0, dated Mar. 29, 2023.
Office Action from Chinese Patent Application No. 202080062786.3, dated Jan. 11, 2023.
Examination Report from European Application No. GB2204420.0, dated Jun. 28, 2023.
Ho, R., "How does one split / combine cryptographic keys?" Atlassian Confluence, Nov. 8, 2018, 2 pages, retrieved from https://atlassian.idtechproducts.com/confluence/pages/viewpage.action?pageId=40633270.
Wagner, D., "CS276 Cryptography Lecture Apr. 14, 2004", eecs.berkley.edu, 2004, 6 pages, retrieved from https://people.eecs.berkeley.edu/~daw/teaching/cs276-s04/22.pdf.
Laroux, C., "Is it possible to combine two private keys to make a third private key without revealing any of the keys?" Reddit, Dec. 2, 2017, 4 pages, retrieved from https://www.reddit.com/r/cryptography/comments/7h20wk/comment/dqnocq2/.
Notice of Reasons for Rejection from Japanese Application No. 2022-515611, dated Apr. 2, 2024, 8 pages.

* cited by examiner

| Case of concern | Encryption enabled at system level? | What to do first? | Format successful? | Secure after format? | What to do second? | Is the SED then secure? |
|---|---|---|---|---|---|---|
| Stolen SED *3 | Yes | Nothing can be done | Not applicable | Not applicable | Nothing can be done | Partially *1 |
| Failed SED | Yes | Format including crypto-erase | No *2 | Partially *1 | Nothing can be done | Partially *1 |
| | | | Yes | Yes | Send to retirer | Yes *4 |

LEGEND:

*1 SED security depends on attacker never gaining access to wrapping key and never being able to break the cryptography used in the key wrapping

*2 a format should succeed unless the SED has failed in a way which prevents it from receiving commands or responding with good status

*3 if a failed SED was not formatted, and was lost in transit as it was being sent to a retirer (e.g., manufacturer or other to retire (erase or destroy) the medium or drive), it is essentially in the same predicament as being stolen

*4 SED is secure because the wrapped MEK was overwritten and thus unrecoverable, regardless of whether someone also has access to the wrapping key

FIG. 8

| Case of concern | Encryption enabled at system level? | What to do first? | Format successful? | Secure after format? | What to do second? | Is the SED then secure? |
|---|---|---|---|---|---|---|
| Stolen SED *3 | Yes | Go to next step | Not applicable | Not applicable | Destroy Key2 | Yes *5 |
| Failed SED | Yes | Format including crypto-erase | No *2 | Partially *1 | Destroy Key2 | Yes *5 |
| | | | Yes | Yes | Send to retirer | Yes *4 |

LEGEND:

*1 SED security depends on attacker never gaining access to wrapping key and never being able to break the cryptography used in the key wrapping

*2 a format should succeed unless the SED has failed in a way which prevents it from receiving commands or responding with good status

*3 if a failed SED was not formatted, and was lost in transit as it was being sent to a retirer, it is essentially in the same predicament as being stolen

*4 SED is secure because the wrapped MEK was overwritten and thus unrecoverable, regardless of whether someone also has access to the wrapping key

*5 SED is secure because Key2 has been destroyed

FIG. 9

| Case of concern | Encryption enabled at system level? | What to do first? | What to do second? | Format successful? | Secure after format? | Is the SED then secure? |
|---|---|---|---|---|---|---|
| Stolen SED *3 | Yes | Destroy Key2 | Go to next step | Not applicable | Not applicable | Yes *5 |
| Failed SED | Yes | Destroy Key2 | Format including crypto-erase | No *2 | Partially *1 | Yes *5 |
| | | | | Yes | Yes | Yes *4 |

LEGEND:

*1 SED security depends on attacker never gaining access to wrapping key and never being able to break the cryptography used in the key wrapping

*2 a format should succeed unless the SED has failed in a way which prevents it from receiving commands or responding with good status

*3 if a failed SED was not formatted, and was lost in transit as it was being sent to a retirer, it is essentially in the same predicament as being stolen

*4 SED is secure because the wrapped MEK was overwritten and thus unrecoverable, regardless of whether someone also has access to the wrapping key

*5 SED is secure because Key2 has been destroyed

FIG. 10

CRYPTO-ERASURE VIA INTERNAL AND/OR EXTERNAL ACTION

BACKGROUND

The present invention relates to crypto-erasure, and more specifically, this invention relates to the techniques and systems for enabling crypto-erasure via internal action and external action.

The term "crypto-erase" generally refers to disabling access to the encryption key needed to unencrypt data in some way. This can be done, e.g., by erasing all copies of the encryption key, removing a portion of the encryption key, disabling access to a sub-key required to generate or unlock the encryption key, etc. By permanently disabling the encryption key, the data encrypted with that encryption key cannot be decrypted; the encrypted data is effectively rendered unencryptable.

It has been stipulated that today's data centers have a major problem with inability to definitively crypto-erase all failed or decommissioned self-encrypting drives (SEDs). For example, it is possible that a SED would fail in way that it can no longer communicate to the system it is in. In such a failed state, the SED cannot receive a command to crypto-erase or respond to such a command with a status indicating that the command to crypto-erase completed successfully. For a data center that is not willing to risk data being forensically recovered from the solid-state drive (SSD) or hard disk drive (HDD) memory of the failed SED which could not be definitively crypto-erased, this is a problem. Today, these data centers typically resort to physically destroying those drives in an effort to prevent forensic recovery. The user cannot, in good conscience, return those drives to the manufacturer or reuse them, for fear of disclosing data.

Note that the Media Encryption Key (MEK) used to encrypt and decrypt data on a SED is not stored in modern-day SEDs in cleartext. The MEK is instead cryptographically wrapped, e.g., itself encrypted or otherwise obfuscated. There is a field of thought that in the very long run this might not be strong enough, that the key wrapping technique might be broken in the foreseeable future (e.g. via quantum computing).

Regardless of the scope of the problem or whether there should be any valid concern that the wrapped key could be decrypted or deciphered, it may very well be true that there are entities who do not want to rely on, or fully trust, the drive to handle non-volatile storage of, and crypto-erasure of, the MEK. Such a user might greatly prefer serving the MEK to the drive after each power up cycle, rather than having the MEK stored on the SED, to assure that the MEK can be destroyed and all the ciphertext created with it crypto-erased. This puts the user in control of the MEK, and said user does not need to worry about the case of the drive failing in a way which does not allow crypto-erase to be performed by the drive. Because the MEK is only stored non-volatilely external to the drive, it can be destroyed by the user, independent of how the SED failed. However, a breach of the user's key store where the MEK is kept, or eavesdropping on (and breaking any security around) communication of that MEK to the SED renders the MEK vulnerable to capture or retrieval.

One way of enabling the ability to crypto-erase a SED externally is by use of the direct key serving model used by LTO-4 (the first encryption-capable LTO tape drive generation). Note that how the keys are handled external to the encryption-capable device determines if they are crypto-erasable or not. But certainly, if an entity's key management is done properly, then it should be possible to definitively crypto-erase all copies of the MEK associated with a failed SED drive. However, copies of the key are typically made and stored in distributed locations to ensure the key remains available to decrypt data, because if no copy of the key remains, the data encrypted under that key, i.e., the ciphertext, will not be decryptable, and thus effectively rendered inaccessible, or "crypto-erased." Thus, key management becomes significantly more difficult to secure as more and more copies of the key are made.

Subsequent to the time of LTO-4, SED technology has standardized around conformance to Trusted Computing Group (TCG) specifications such as their TCG Storage's Security Subsystem Classes (SSC) including (at first) Enterprise and (more recently) Opal. Both of those SSCs support crypto-erase in multiple different ways. For example, there are at least four different ways to invoke a crypto-erase in the case of Opal. But neither TCG SSC supports crypto-erase by an external entity independent of the SED itself, i.e., if the SED cannot honor a method (command) specified by the SSC. The MEK is always stored in the SED, typically in cryptographically wrapped form. If someone can, in some way, figure out how to break open the wrapped MEK, that person can recover all the associated ciphertext stored in a failed SED.

SUMMARY

A device-implemented method, according to one aspect of the present invention, includes receiving, at a device configured to perform data operations on a storage medium, a request to read data, the data being stored on the storage medium in encrypted form. A first key stored within the device is accessed. A second key is received from an external source. A media encryption key is generated using the first and second keys. The encrypted form of the data is read from the storage medium. The encrypted form of the data is decrypted using the media encryption key. The decrypted data is output. This method enables locally encrypted data to be crypto-erased by both internal and external actions.

A device-implemented method, according to another aspect of the present invention, includes receiving, at a device configured to perform data operations on a storage medium, a request to read data, the data being stored on the storage medium in encrypted form. A first key stored on and/or with the storage medium is retrieved. A second key is retrieved from an external source. A media encryption key is generated using the first and second keys. The encrypted form of the data is read from the storage medium. The encrypted form of the data is decrypted using the media encryption key. The decrypted data is output. This method enables locally encrypted data to be crypto-erased by both internal and external actions. Where removable storage media is used, the first key travels with the media, but the data remains secure until the second key is provided.

A device-implemented method, according to yet another aspect of the present invention, includes receiving, at a device configured to perform data operations on a storage medium, a request to write data to the storage medium in encrypted form. A first key stored within the device is accessed. A second key is received from an external source. A media encryption key is generated using the first and second keys. The requested data is written to the storage medium in encrypted form using the media encryption key.

This method enables the written encrypted data to be crypto-erased by both internal and external actions.

A device-implemented method, according to yet another aspect of the present invention, includes receiving, at a device configured to perform data operations on a storage medium, a request to write data to the storage medium in encrypted form. A first key stored on and/or with the storage medium is retrieved. A second key is received from an external source. A media encryption key is generated using the first and second keys. The requested data is written to the storage medium in encrypted form using the media encryption key. This method enables the written encrypted data to be crypto-erased by both internal and external actions.

In various approaches, the device performing any of the respective methods is preferably configured to prohibit transfer of the first key to outside of the device. Accordingly, because the first key cannot leave the device, deletion of the first key from the device effectively crypto-erases the encrypted data on the device.

Various approaches described herein are applicable to many types of storage media, including nonvolatile memory and magnetic recording tape.

Other aspects and approaches of the present invention will become apparent from the following detailed description, which, when taken in conjunction with the drawings, illustrate by way of example the principles of the invention.

BRIEF DESCRIPTION OF THE DRAWINGS

FIG. 8 is a chart depicting the current state of the art for retiring and securing standard storage products that use a SED.

FIG. 9 is a chart depicting illustrative procedures for retiring and securing storage products that use a SED, in accordance with one aspect of the present invention.

FIG. 10 is a chart depicting illustrative procedures for retiring and securing storage products that use a SED, in accordance with one aspect of the present invention.

DETAILED DESCRIPTION

Figure 1:
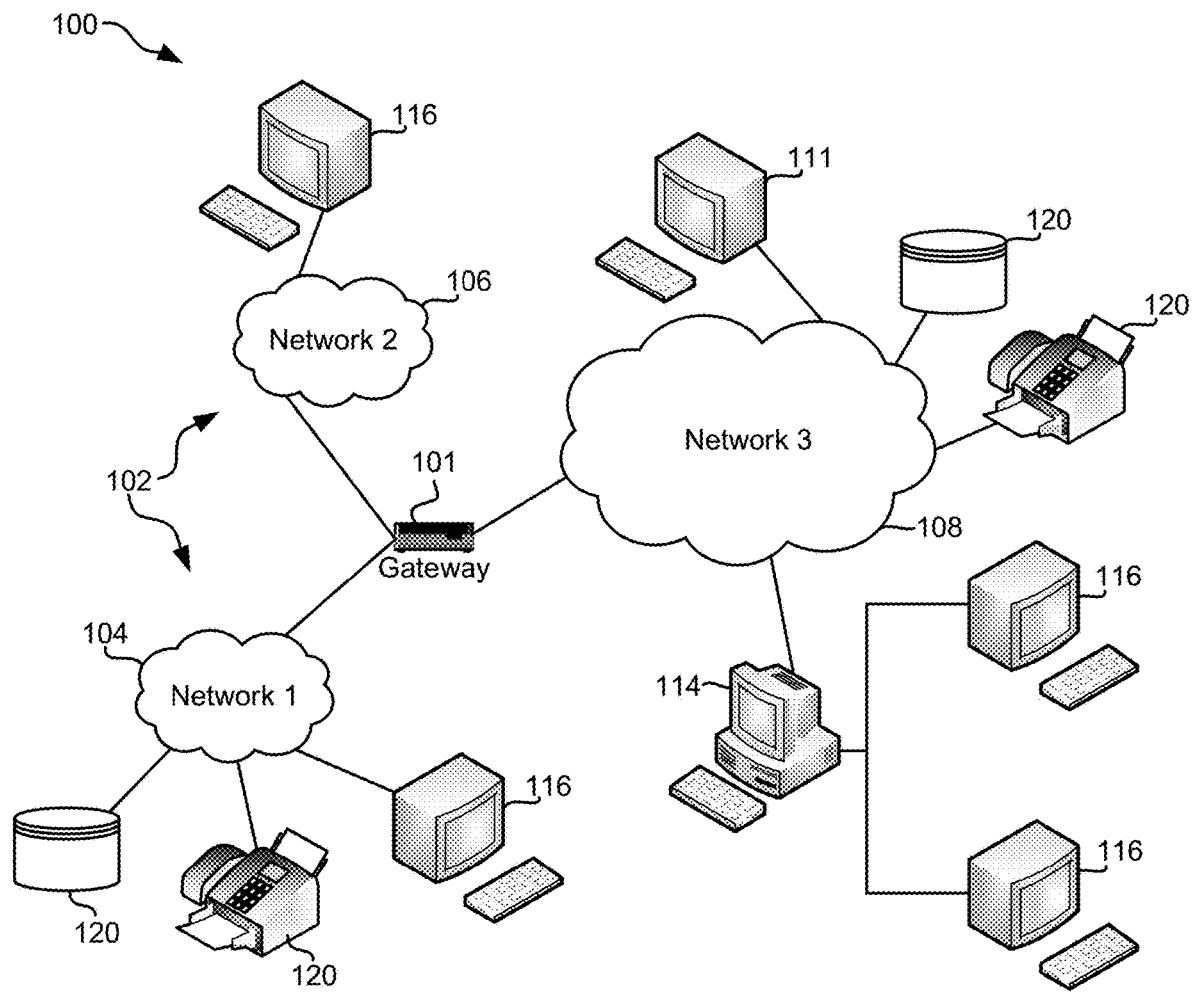
FIG. 1 is a diagram of a network architecture, in accordance with one aspect of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description herein discloses several preferred approaches of systems, methods and computer program products for enabling locally encrypted data to be crypto-erased by both internal and external actions. In one approach, a Media Encryption Key (MEK) that is used to encrypt/decrypt data is split into two parts—one key share (Key1) is stored with the data, and the other key-share (Key2) is managed externally. In one approach, Key1, which is in non-volatile form, is only stored with the data, optionally in wrapped form (e.g. encrypted or otherwise protected). Key2, which may be stored in non-volatile form, is only stored external to the device/product having the data, and so Key2 has to be served to the device reading the data to enable encryption and/or decryption. The MEK can be calculated only when the device has both Key1 and Key2.

In one general approach, the data is stored in a Self-Encrypting Drive (SED). Key1 is managed internally to the SED, and may be stored in the SED in raw form, or in wrapped form. Key2 is provided to the SED at least once after a power cycle and/or other cold boot to allow the MEK to be calculated internal to the SED.

In another general approach, the data is stored on a storage medium such as on a magnetic recording tape, in a non-volatile random access memory (NVRAM, such as solid state memory, hard disk, etc.), etc. Key1 is stored on and/or with the storage medium, and may be stored in wrapped form. Key2 is provided to the drive, computer, etc. to allow the drive, computer, etc. to calculate the MEK.

In one exemplary aspect of the present invention, a device-implemented method includes receiving, at a device configured to perform data operations on a storage medium, a request to read data, the data being stored on the storage medium in encrypted form. A first key stored within the device is accessed. A second key is received from an external source. A media encryption key is generated using the first and second keys. The encrypted form of the data is read from the storage medium. The encrypted form of the data is decrypted using the media encryption key. The decrypted data is output.

In another exemplary aspect of the present invention, a device-implemented method includes receiving, at a device configured to perform data operations on a storage medium, a request to read data, the data being stored on the storage medium in encrypted form. A first key stored on and/or with the storage medium is retrieved. A second key is retrieved from an external source. A media encryption key is generated using the first and second keys. The encrypted form of the data is read from the storage medium. The encrypted form of the data is decrypted using the media encryption key. The decrypted data is output.

In another exemplary aspect of the present invention, a device-implemented method includes receiving, at a device configured to perform data operations on a storage medium, a request to write data to the storage medium in encrypted form. A first key stored within the device is accessed. A second key is received from an external source. A media encryption key is generated using the first and second keys. The requested data is written to the storage medium in encrypted form using the media encryption key.

In another exemplary aspect of the present invention, a device-implemented method includes receiving, at a device configured to perform data operations on a storage medium, a request to write data to the storage medium in encrypted form. A first key stored on and/or with the storage medium is retrieved. A second key is received from an external source. A media encryption key is generated using the first and second keys. The requested data is written to the storage medium in encrypted form using the media encryption key.

Illustrative Computing Environment

FIG. 1 illustrates an architecture 100, in accordance with one approach. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one approach.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment, a UNIX® system which virtually hosts a Microsoft® Windows® environment, a Microsoft® Windows® system which emulates an IBM® z/OS® environment, etc. This virtualization and/or emulation may be enhanced through the use of VMware® software, in some approaches.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
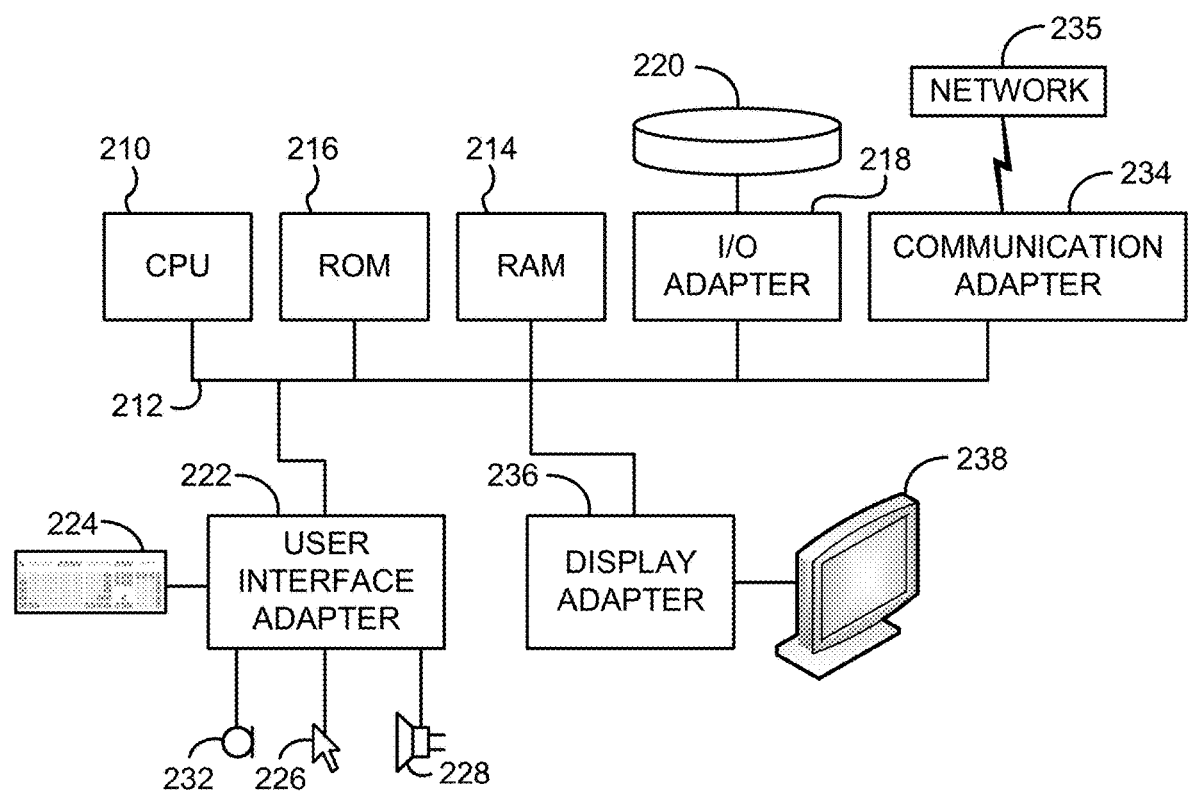
FIG. 2 is a diagram of a representative hardware environment that may be associated with the servers and/or clients of FIG. 1, in accordance with one aspect of the present invention.

FIG. 2 shows a representative hardware environment associated with a user device 116 and/or server 114 of FIG. 1, in accordance with one approach. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g. a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred approach may also be implemented on platforms and operating systems other than those mentioned. A preferred approach may be written using eXtensible Markup Language (XML), C, and/or C++ language, or other programming languages, along with an object oriented programming methodology. Object oriented programming (OOP), which has become increasingly used to develop complex applications, may be used.

Figure 3:
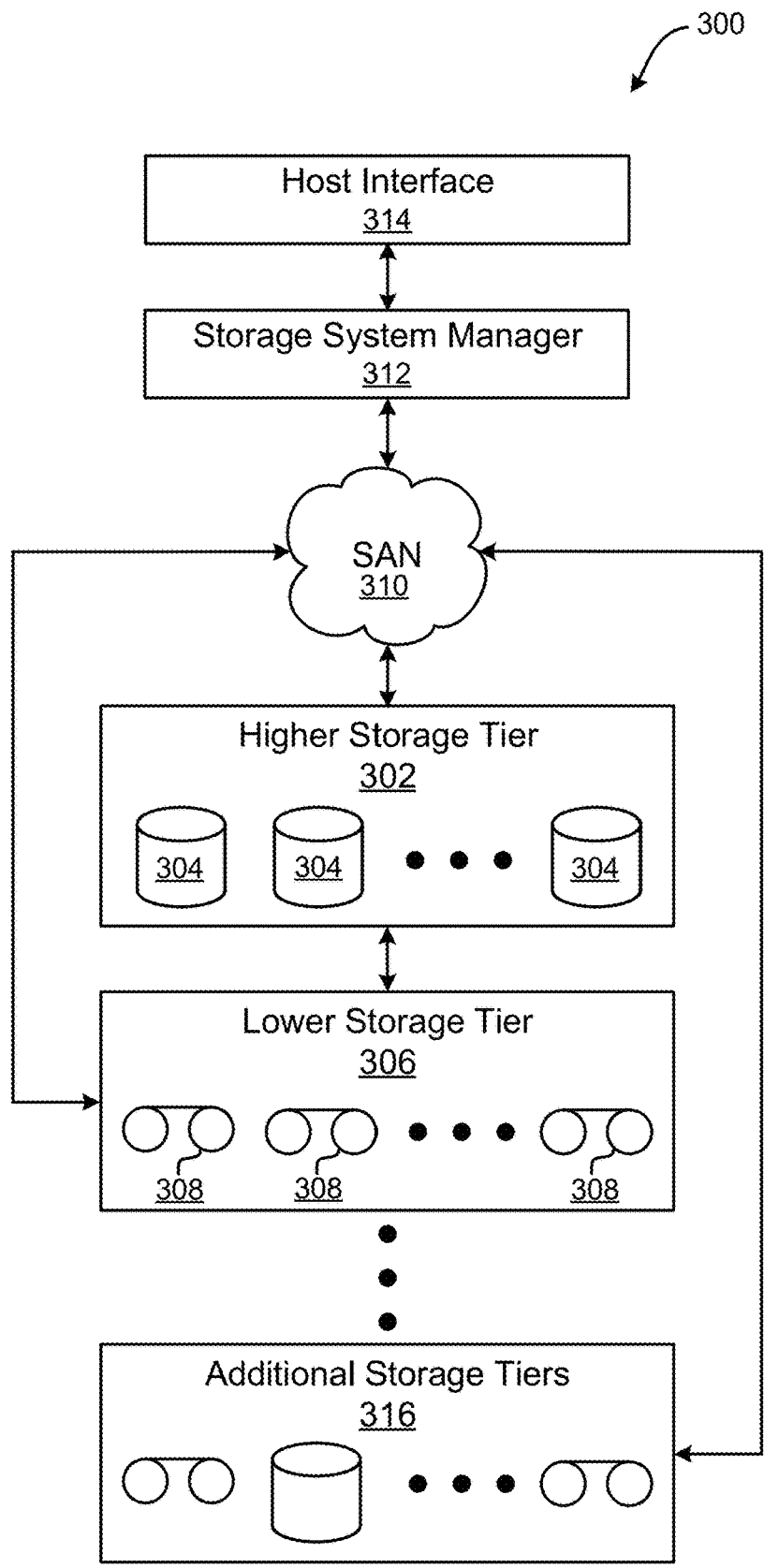
FIG. 3 is a diagram of a tiered data storage system, in accordance with one aspect of the present invention.

Now referring to FIG. 3, a storage system 300 is shown according to one approach. Note that some of the elements shown in FIG. 3 may be implemented as hardware and/or software, according to various aspects. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more approaches, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the approaches and aspects presented herein.

According to some approaches, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various approaches.

Inventive Methods for Enabling Crypto-Erase

The following description discloses several preferred approaches of systems, methods and computer program products for enabling locally encrypted data to be crypto-erased by both internal and external actions. In one approach, a MEK that is used to encrypt/decrypt data is split into two parts—one key share (Key1) is stored with the data (e.g. in the SED, on a tape, etc.), and the other key-share (Key2) is managed externally. In one approach, Key1, which is in non-volatile form, is only stored with the data, preferably in wrapped form. Key2, which may be in non-volatile form, is only stored externally to the device/product having the data, and so Key2 has to be served to the device reading/writing the data to enable encryption and/or decryption. The MEK can be calculated only when the device has both Key1 and Key2.

In one general aspect, the data is stored in a SED. Key1 is managed internally to the SED, and may be stored in the SED in raw form, or more preferably in wrapped form. Key2 is provided to the SED at least once after a power cycle and/or cold boot of the SED to allow the MEK to be calculated.

In another general approach, the data is stored on a storage medium such as a magnetic recording tape, in NVRAM, etc. Key1 is stored on and/or with the storage medium, and may be stored in wrapped form. For example, Key1 may be stored on a portion of a magnetic recording tape, in a tape cartridge memory, or both. That way, Key1 is portable with the magnetic recording tape. Similarly, for an NVRAM device, Key1 may be stored in NVRAM, in a separate memory, etc. Key2 is provided to the tape drive, computer, etc. to allow the drive, computer, etc. to calculate the MEK.

Crypto-Erase in SED

While much of the following description is presented in association with an exemplary implementation with a SED, this has been done by way of example only and solely to provide a context as an aid for the reader. Accordingly, the concepts and teachings presented hereinbelow are equally applicable to implementations with storage media such as magnetic recording tapes, memory cards, etc.

Figure 4:
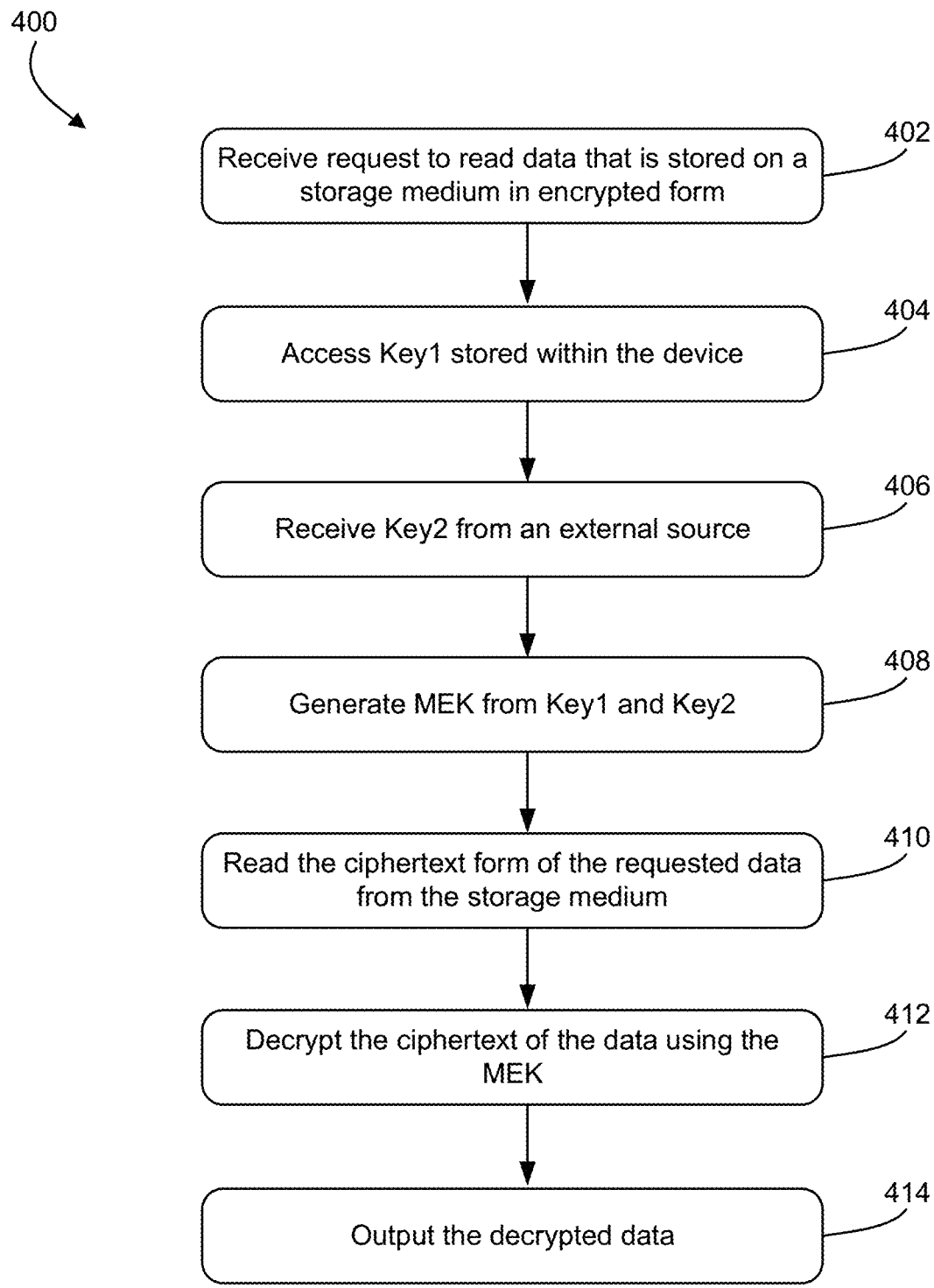
FIG. 4 is a flowchart of a method, in accordance with one aspect of the present invention.

Now referring to FIG. 4, a flowchart of a method 400 is shown according to one approach. The method 400 may be performed in accordance with the present invention in any of the environments depicted in the other FIGS. described herein, among others, in various approaches. Of course, more or fewer operations than those specifically described in FIG. 4 may be included in method 400, as would be understood by one of skill in the art upon reading the present descriptions.

Each of the steps of the method 400 may be performed by any suitable component of the operating environment. For example, in various approaches, the method 400 may be partially or entirely performed by a computer, a drive, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a device, that is configured to perform data operations on a storage medium such as reading and/or writing data from/to the storage medium, receives a request to read data, the data being stored on the storage medium in encrypted form. The request may simply request the data, or may include additional information such as Key2 (see below).

In operation 404, a first key (Key1) stored within the device is accessed, e.g., from a memory of the device, from an ASIC, etc. As noted above, in some approaches, the first key is stored in the device in raw (unencrypted) form. In other approaches, the first key is stored in the device in wrapped form (e.g. encrypted form, password protected form, obfuscated form, etc.). Information such as another key, a password, etc., for unwrapping the first key may be received and used to unwrap the first key.

In preferred aspects, the device is configured to prohibit transfer of the first key to outside of the device. However, a controller internal to the device may access the first key within the device.

In operation 406, a second key (Key2) is received from an external source. The external source may be any external source. For example, the external source may be the requestor of the data, a key store, a key server, a key input by a user (e.g. via a keyboard, by insertion of a flash drive, etc.).

In operation 408, a media encryption key (MEK) is generated using the first and second keys. Any known technique may be used to create a MEK from the first and second keys, e.g. by XORing the first and second keys.

In operation 410, the encrypted form (i.e. ciphertext) of the requested data is read from the storage medium, e.g., using conventional techniques. The storage medium may be any type disclosed herein, e.g., magnetic tape, magnetic disk, NVRAM, etc. Accordingly, the device may be any type of data storage device, e.g., tape drive, SSD, HDD, encryption-capable USB drives, NVRAM modules, etc.

The ciphertext of the requested data is decrypted using the MEK in operation 412 to give the unencrypted (i.e. cleartext) form of it. The ciphertext of the requested data may be copied into a buffer and then decrypted, may be decrypted "on the fly" during reading (e.g. operations 410 and 412 are performed simultaneously), etc.

The decrypted data is output in operation 414, e.g., to a requestor of the data over the host interface, etc.

If second data is to be stored by the device on the storage medium, the second data is received. A third key may also be received from a second external source. A second media encryption key may also be generated from the first and third keys. The data is encrypted using the second media encryption key, and the encrypted data is written to the storage medium. Note that the second external source may be the same as the external source noted above, or different. Likewise, the third key may be different from, or the same as, the second key. If the third key is the same as the second key, the drive would typically not have to receive it again.

Aspects of the various operations of FIG. 4 are provided below. Such aspects are presented by way of example only, and are not intended to be limiting. Moreover, such aspects may be combined in any way, in accordance with the plethora of possible approaches of the present invention.

A MEK may be created from two separate keys using any technique known in the art and/or that would become apparent to one skilled in the art upon reading the present description. For example, one way to create a MEK key which requires the use of both Key1 and Key2 to calculate is to have Key1 and Key2 be two independently generated random numbers, and then perform a calculation which requires both Key1 and Key2, such as the XOR or concatenation of these two values, to calculate the MEK. The MEK may alternately be 'split' into two (or more) key-shares, e.g. Key1 and Key2, using a key splitting algorithm (e.g. Shamir's, Blakely's (Euclidean), etc.).

Key1 may originate from any conceivable source. Key1 is preferably created internal to the SED, this being the most secure approach, as copies of Key1 would never need to exist outside of the SED unless deliberately copied therefrom.

In other approaches, Key1 may be created externally to the SED and served to the SED. For example, Key1 may be programmed into the device during manufacturing build, may be programmed into the device when the data is written, etc.

In yet further approaches, which may include additional features and operations from any other approach described herein, Key1 and/or Key2 may be calculated in conjunction with writing the data. For example, in the case of a write, where a new MEK may be used, the MEK may be generated (e.g. by random number generation or other known technique), and the Key1 and Key2 key-shares can then be calculated from the MEK using a known key splitting algorithm such as Shamir's, Blakely's (Euclidean), etc. The MEK generation and key-share calculation are preferably performed by the device. Then the Key1 may be retained internal to the device and Key2 may be exported from it, for external storage. In various aspects, this MEK generation is performed preemptively (i.e. before the write command is received, so that it does not affect the time required to process the write) or responsively (e.g. in response to the write command, in which case Key2 is preferably exported out of the device, for external storage, before the command complete of the write operation).

In one aspect, Key1 may be specific to particular set of data, and thus the device may store multiple unique Key1s, each associated with a unique dataset.

Preferably, the SED is configured to not allow any external visibility of Key1 or transfer or copying of Key1 out of the SED.

Key2 can be created internally in the SED (which is the preferred method if a key splitting algorithm is used to create a key-share which will be Key2), or externally to the SED, etc.

In an illustrative approach, Key1 is the first key-share of the MEK, a first random number the same length (in bits) as the MEK. Key2 is the second key-share of the MEK, a second random number the same length as the MEK. Key1 is processed with Key2 in a predefined manner to generate a resulting MEK. For example, Key1 may be XORed (or the like) with Key2 to generate the MEK. Alternately, standard key derivation techniques (e.g. using hashing or encryption) can be used instead of the XOR operation (or the like) to calculate the MEK. Any form of key derivation which requires processing of both Key1 and Key2 for calculation of the MEK is potentially acceptable. In the case where key splitting was used to generate Key1 and Key2 from the MEK, the calculation used to create the MEK from Key1 and Key2 would be the complementary or inverse (of the split) calculation.

Note that with this split-key technique, if one does not have the MEK, then the only way to calculate the MEK is to have both Key1 and Key2. In the context of M of N key splitting generally, this could be thought of as an implementation of 2 of 2 key-shares (which is what Key1 and Key2 are) are required to rebuild the (MEK) key. An alternate, though inferior, embodiment would be to have M set to 2 and generate a number N of key-shares greater than 2, but to discard or destroy all but two of the other key shares and so only use the remaining two of those key-shares (which effectively reduces the key split to 2 of 2, but increases the complexity of the combining calculation).

One preferred approach to implement a split key MEK is to extend TCG Opal (or other TCG SSC) to support this two key-share concept such that one key-share (Key1) is managed internally to the SED, and the other key-share (Key2) is managed externally to the SED. Anyone familiar with the complexity of TCG's Opal SSC would appreciate that there are many, many ways to implement this concept, and accordingly, the invention is not limited to the exemplary description presented herein.

In one illustrative approach, only the wrapped form of Key 1 is stored in non-volatile memory in the SED. Key2 is only stored outside of the SED in non-volatile form and so has to be served to (or accessed by) the SED at least once after a power cycle and/or cold boot to allow the MEK to be calculated. The MEK can be calculated only when the SED has both Key1 and Key2. Thus, Key2 has to be served to (or accessed by) the SED in some form. There are many ways this may be done, according to various aspects. One way is to have the SED support a Key Management Interoperability Protocol (KMIP) client and to request and receive Key2 over a secure channel from an external key manager of a type known in the art. Alternately, Key2 may be served to the SED in a manner similar to the way Personal Identification Numbers (PINs) are, e.g. in cleartext form, through a secure tunnel (e.g. TLS), etc.

Key1 is preferably stored in the SED in wrapped form and is unwrappable until the wrapping key (which may be dependent on PINs served to the SED to authenticate different users to different roles the SED supports) is provided. Accordingly, whatever parts of the wrapper key are provided from outside of the SED are served to the SED to allow Key 1 to be unwrapped. Once the SED has been served, or has accessed, all the required information (including Key2) necessary to calculate the MEK, the SED calculates the MEK and then is capable of decrypting existing ciphertext to produce the resultant cleartext (e.g. to respond to a Host Read), or encrypting newly received customer data in cleartext form to ciphertext (e.g. to honor a Host Write).

In one approach, Key2 is the PIN associated with some Administrative Security Provider (hereafter "AdminSP") role that is enabled once an authorized entity such as the Drive Owner has authenticated with the System Identification Number (SID) or some other PIN associated with a role which is has the proper authority.

The PIN of Key2 may be allowed to change. In one approach, Key2's PIN would start with a default value, e.g., some predefined value such as all zeroes (0x000 . . . ). One contemplated implementation would allow Key2's PIN to be changed, but only before the PIN of the first Administrative authority of the AdminSP (e.g. AdminSP.Admin1) is customized, to disallow inadvertent crypto-erasure of data encrypted by the MEK by unintended changing of Key2's PIN. Alternately, Key2's PIN may be allowed to be changed at any time to provide an alternate way of invoking crypto-erase.

In the case where Key2 will be set to a newly generated random number, it might seem that Key2's PIN would logically be generated external to the SED (e.g. by the user and his or her external key management infrastructure), though that generation may have actually been simply by invocation of the SED's Random method (a command the SED must support (it is an unauthenticated service) if it complies with TCG's Opal specification). In response to the Random method the SED calculates a new random number using any known acceptable technique and returns (provides) it to the host.

An alternate implementation includes having the SED be the source of the generation of Key2 in some or all cases. In that case, the Key2 may be read from the SED. Ideally this implementation continues along the general path suggested above, which is to enable this to be done with existing TCG Opal methods (commands). For example, one approach uses the Random method in a SED to generate Key2. Then the AdminSP.Key2's PIN is personalized by the host to that same random value it just read from the SED via Random. Note that by changing Key2's PIN from its default value, the host has assumed the responsibility of storing this PIN. To do this, the SED only stores the last random number generated by Random in volatile memory and then designates that last random number generated as a candidate Key2. If the AdminSP.Key2's PIN is set to this same value, then the SED allows the Key2.PIN to be changed to this new value. Note that if the host attempts to set the AdminSP.Key2 PIN to a value other than the last random number given by Random, the SED may then optionally decline to accept this PIN change and post the appropriate error code indicating that the command failed. In this case, the SED can continue to honor Key2's PIN's default value (i.e. all zeroes= 0x000 . . . ), which essentially reverts the SED to the same standard operation (i.e. as a SED complying with TCG's Opal would operate today).

Cryptography

Note that one standard way for a SED to authenticate a PIN is by hashing it and comparing it to the hash of that PIN calculated when it was first set (and since stored non-volatilely in the SED). The discussion above has AdminSP.Key2's PIN used as Key2. Note this particular PIN should be treated differently than others in that no hash of this PIN should be stored to in the SED, because at some point in the future this could conceivably become insecure (i.e. if the hash is broken in the future, say by quantum computing). If nothing else the hash would provide a way to test brute force guesses. Which is to say there are valid reasons to not just rely on a hash of the PIN as the way to authenticate the AdminSP.Key2's PIN. Accordingly, Key2's PIN cannot be authenticated independently of validating the MEK itself, which is why the Key2 role preferably has no authorization other than to change its own password. This eliminates any direct, immediate need to authenticate that PIN.

Eventually Key1 and Key2 are XOR'd, combined, or the like to create the MEK.

One way to verify that the resultant MEK is correct (e.g. vs. being one bit off, which would happen if Key2 was one bit off), a key signature concept may be used. The key signature concept includes using the key to encrypt a known value, and the resultant ciphertext is then stored as the signature of that key.

In a preferred approach to verify that the resultant MEK is correct is to perform key management internal to the SED in such a way that having Key2 available is a requirement for Key1 to be successfully unwrapped. For example, a keystream may be created by key derivation from Key2, and that keystream is XOR'd or the like with the wrapped key structure before it is stored in non-volatile form inside the device. Then the 8-byte checksum built into the Advanced Encryption Standard (AES) Key Wrap serves to validate both Key2 and whatever other wrapper key was used to wrap Key1. Accordingly, a key derivation on Key2 is preferably used to create enough derivative key material to span the full wrapped key structure. The XOR of that keystream with the wrapped key structure (WKS) creates a new protected wrapped key structure (PWKS) which is stored in place of the original WKS. At this point any bit in the PWKS would have a 50% probability of being right vs. wrong and any speculative 'correction' to it could (with enough convergent correction) settle on essentially any of the very large number of key wrap structure possibilities. Accordingly, the XOR of a keystream with the wrapped key structure itself is effectively a second wrapping, which allows yet another approach in which the data inside the double wrap is the MEK, and the combining is effected by performing the two unwraps.

Note that, in some of the foregoing approaches, Key2's PIN has become what is called a Cryptographically Sensitive Parameter (CSP). If there is any chance the data passing between the SED and the host could be recorded, the channel between them should be protected with some form of encryption of data in flight (EDiF) such as Internet Protocol Security (IPsec), Fibre Channel-Security Protocol (FC-SP), or Transport Layer Security (TLS). In some data centers there is no concern about data being passed back and forth to a SED in that environment; the concern is only what happens to that SED after it leaves that protected environment, which is why absolute assurance of crypto-erase is desirable.

Note that in the case of XTS mode of encryption (e.g. XTS-AES-256) there are two encryption-related keys, an encryption key and a separate tweak key. In some approaches, both of these keys can be generated (via key derivation) from a single root key. Accordingly, a 256-bit MEK can be provided and may be used to generate (via key derivation) the two 256-bit keys required for XTS-AES-256.

Crypto-erase options in SEDs which have implemented various aspects of the present invention include one or more of the following:

1. If a user wants to crypto-erase an operational SED, the user simply invokes one of the multiple different ways to do so as suggested herein. The wrapped key structures are overwritten and Key1 is now unrecoverable. In this scenario there is no need to also erase Key2, the MEK is unrecoverable because Key1 is gone.

2. If a user wants to crypto-erase a SED (possibly because it is a non-operational SED, which does not respond to commands, or a missing SED), but cannot do '1.' for whatever reason, the user now has another option—to instead erase Key2, which the user controls, independent of the SED. In this scenario there is no need to erase all the wrapped versions of Key1; the MEK is unrecoverable because Key2 is gone. In this scenario, even if someone could, at some point in the future, break open the wrapped key structures of a failed SED and so gain access to Key1, they have done all that work to no avail as the MEK remains unavailable. For that they need Key2 which has been erased. Accordingly, they are still left in the scenario where the only viable path to accessing customer data is to break the encryption algorithm (e.g. XTS-AES-256) protecting the ciphertext of the user data itself.

3. If a user is especially concerned with security of the crypto-erase, the user may choose to delete both Key1 and Key2. This scenario may be most likely if there is concern that Key2 might have been recorded (e.g. in flight to the SED, even if protected by some secure channel the security of which was (perhaps subsequently) broken). But there should be no reason, otherwise, to require the deletion of both Key1 and Key2, because of the cryptography involved. One general approach is fairly resilient (e.g. to the SED becoming non-operational) is to always attempt to erase both Key 1 and Key2, but to be satisfied so long as there is verification that one of those two erasures succeed.

Crypto-Erase for Magnetic Recording Tape and Other Portable Memory

As noted above, in some approaches, encrypted data is stored on a non-volatile storage medium such as a magnetic recording media (e.g. tape, disk) or solid-state memory (e.g. NAND flash, NVRAM, etc.). Again, any of the operations, concepts, etc. presented above may be used in the present approaches.

Figure 5:
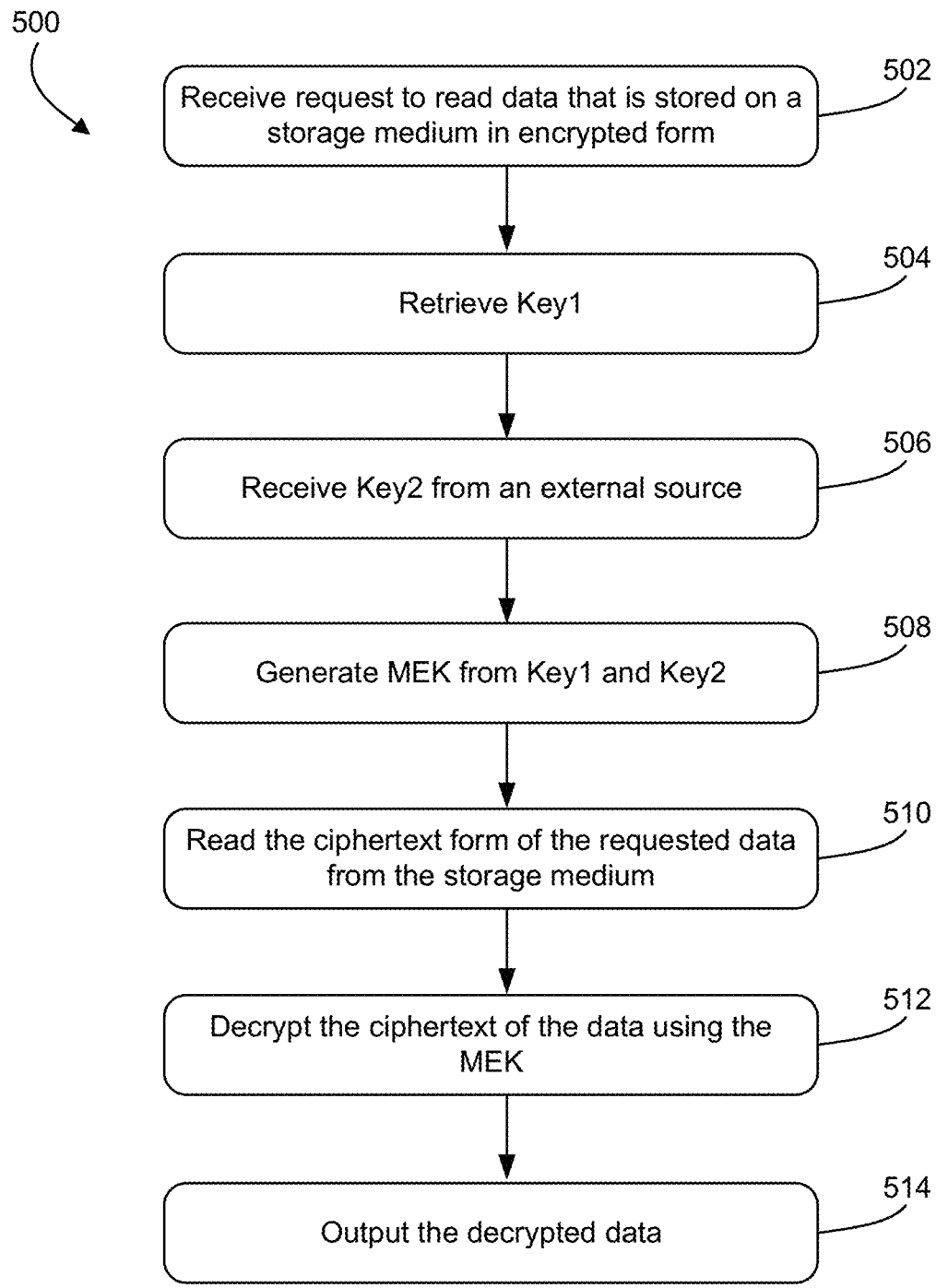
FIG. 5 is a flowchart of a method, in accordance with one aspect of the present invention.

Now referring to FIG. 5, a flowchart of a method 500 is shown according to one approach. The method 500 may be performed in accordance with the present invention in any of the environments depicted in the other FIGS. described herein, among others, in various approaches. Of course, more or fewer operations than those specifically described in FIG. 5 may be included in method 500, as would be understood by one of skill in the art upon reading the present descriptions.

Each of the steps of the method 500 may be performed by any suitable component of the operating environment. For example, in various approaches, the method 500 may be partially or entirely performed by a computer, a drive, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a device, that is configured to perform data operations on a storage medium such as reading and/or writing data from/to the storage medium, receives a request to read data, the data being stored on the storage medium in encrypted form. The request received may simply be a request for data, or may include additional information such as Key2 (see below).

In operation 504, a first key (Key1) stored on and/or with the storage medium is retrieved. This procedure may include retrieving the first key from the medium on which the data is stored, from a memory physically coupled to the medium such as a cartridge memory, and the like.

The storage medium may be any type disclosed herein, e.g., magnetic tape, magnetic disk, NVRAM, etc. Accordingly, the device may be any type of data storage device, e.g., tape drive, SSD, HDD, etc.

As noted above, in some approaches, the first key is stored on and/or with the storage medium in raw (unencrypted) from. In other approaches, the first key is stored on and/or with the storage medium in wrapped form (obfuscated form e.g., encrypted form, password protected form, etc.). Information such as another key or PIN, a password, etc. for unwrapping the first key may be received and used to unwrap the first key.

In preferred aspects, the device is configured to prohibit transfer of the first key to outside of the device. However, a controller internal to the device may access the first key from the storage medium or other source that is coupled to the storage medium.

In operation 506, a second key (Key2) is received from an external source. The external source may be any external source. For example, the external source may be the requestor of the data, a key store, a key server, a key input by a user (e.g. via a keyboard, etc.).

In operation 508, a media encryption key (MEK) is generated using the first and second keys. Any known technique may be used to create a MEK from the first and second keys.

In operation 510, the requested data, in ciphertext form, is read from the storage medium, e.g., using conventional techniques.

The ciphertext of the requested data is decrypted using the MEK in operation 512. The data may be copied into a buffer and then decrypted, may be decrypted "on the fly" during reading (e.g. operations 510 and 512 are performed simultaneously), etc.

The decrypted data is output in operation 514, e.g., to the requestor of the data, etc.

If second data is to be stored by the device on the storage medium, the second data is received. A third key may be received from a second external source. If so, a second media encryption key is generated using the first and third keys. The data is encrypted using the second media encryption key, and the encrypted data is written to the storage medium. Note that the second external source may be the same as the external source noted above, or different therefore. Likewise, the third key, if one is received, may be different from, or the same as, the second key.

Aspects of the various operations of FIG. 5 are provided below. Such aspects are presented by way of example only, and are not intended to be limiting. Moreover, such aspects may be combined in any way, in accordance with the plethora of possible approaches of the present invention. For example, method 500 may have or incorporate similar features as those presented above in relation to FIG. 4, e.g. such as key generation, etc.

Key1 is stored with the storage medium, e.g. on the medium itself and/or with the storage medium e.g. in a separate memory. Key1 is preferably stored in wrapped form. For example, Key1 may be stored on a portion of a magnetic recording tape, in a tape cartridge memory, or both. That way, Key1 is portable with the magnetic recording tape. Similarly, for an NVRAM device such as a memory stick, memory card, etc., Key1 may be stored in the NVRAM of the device, in a separate memory of the device, etc.

Key1 is preferably created internal to the device (e.g. drive, computer, etc.) operating on the storage medium. Preferably, the device is configured to not allow any external visibility of Key1 or copying of Key1 to outside of the device, except to the storage medium and/or memory coupled thereto. Preferably the device transfers Key1 to the storage medium and/or memory coupled thereto and deletes Key1 from the device. Thus, Key1 only resides with the storage medium in some approaches, such as those associated with removable media devices.

In the case of a device where the storage media is integral to the device itself (e.g. a Self-Encrypting Drive (SED) type of HDD or SSD, NVRAM module, etc.), Key1 may be stored with the device. For example, in a (possibly hermetically) sealed SED enclosure, Key1 may be kept anywhere inside that typically rectangular boundary. In the case of a SSD, the main non-volatile memory (where user data is stored) is often NAND flash. Key1 (possibly in wrapped form) may be stored there as well. In other approaches, Key1 may instead be kept in a separate (from user data) non-volatile memory inside the housing such as: in a different NAND flash or NOR flash chip; in magnetic random-access memory (MRAM); in spin-transfer torque random-access memory (STT-RAM); in ferroelectric random-access memory (FeRAM); in phase-change memory (PCM); in a resistive random-access memory (RRAM); in other forms of NVRAM (which is less technology specific than the preceding terms); etc. Note that Key1 may also be stored in a form of ROM that can be erased, such as EEPROM. Thus, in various approaches, Key 1 may be stored in a different type of memory than the storage medium storing the user data.

In other approaches, Key1 is created externally to the device and served to and stored in the device.

Key2 can be created inside the device or externally to the device, or by joint contributions from inside and outside of the device.

Key2 is provided to and/or stored in volatile memory (e.g. SRAM) in the tape drive, computer, etc. to allow the drive, computer, etc. to calculate the MEK. In one approach, Key2 may be input to the tape drive, computer, etc. each time it is required. In another approach, once served to the device, Key2 may be retained internal to the device stored in volatile memory on the tape drive, computer, etc., in which case Key2 is preferably wrapped.

It should be appreciated that various approaches herein can be implemented with a wide range of memory mediums, including for example NVRAM technologies such as NAND Flash memory, NOR Flash memory, phase-change memory (PCM), magnetoresistive RAM (MRAM) and resistive RAM (RRAM). To provide a context, and solely to assist the reader, various approaches may be described with reference to a type of non-volatile memory. This has been done by way of example only, and should not be deemed limiting on the invention defined in the claims.

In one illustrative approach, Key1, in non-volatile form, is only stored with the storage medium in wrapped form. And Key2, while it may be stored temporarily in volatile memory, is only stored in non-volatile form outside of the storage medium.

The drive, computer, etc. operating on the storage medium retrieves Key1 from the storage medium and receives or obtains Key2 to allow the MEK to be calculated.

Key2, which is preferably not stored locally on the drive, computer, etc., may be served to the drive, computer, etc. in some form. There are many ways this may be done, according to various aspects, including any of the approaches listed in the previous section. For example, one way is to have the drive, computer, etc. support a KMIP client and to receive Key2 over a secure channel from an external KMIP server (key manager) of a type known in the art.

Key2 is stored locally on the drive, computer, etc. in some approaches, preferably in wrapped form. A key to unwrap Key2 may be received from a user, received from a key manager, etc.

Key1 is preferably stored with the storage medium in wrapped form and is unwrappable upon the drive, computer, etc. being provided the wrapper key (which may be, or dependent on, Personal Identification Numbers (PINs) served to the drive, computer, etc. to authenticate different users to different roles the drive, computer, etc. supports). Accordingly, whatever parts of the wrapper key are provided from outside of the drive, computer, etc. are served to the drive, computer, etc. to allow Key1 to be unwrapped. Once the drive, computer, etc. has accumulated all the required information (including Key2) necessary to calculate the MEK, the drive, computer, etc. calculates the MEK and then is capable of decrypting existing ciphertext to produce the resultant cleartext (e.g. to respond to a Host Read), or encrypting new customer data in cleartext form to ciphertext (e.g. to honor a Host Write).

In one approach, Key2 is a PIN, as described in the previous section.

An alternate implementation includes having the drive, computer, etc. be the source of the generation of Key2 in some or all cases. In that case, the Key2 may, at first, be read from memory of the drive, computer, etc.

In tape drive-implemented approaches, it is preferred that the Key 1 comes from the tape media, and the Key2 comes from some interface, and that the calculation of the MEK is internal to the tape drive, and never leaves the tape drive.

Writing with Crypto-Erase-Enabled SED

While much of the following description is presented in association with an exemplary implementation with a SED, this has been done by way of example only and solely to provide a context as an aid for the reader. Accordingly, the concepts and teachings presented hereinbelow are equally applicable to implementations with storage media such as magnetic recording tapes, memory cards, etc.

Figure 6:
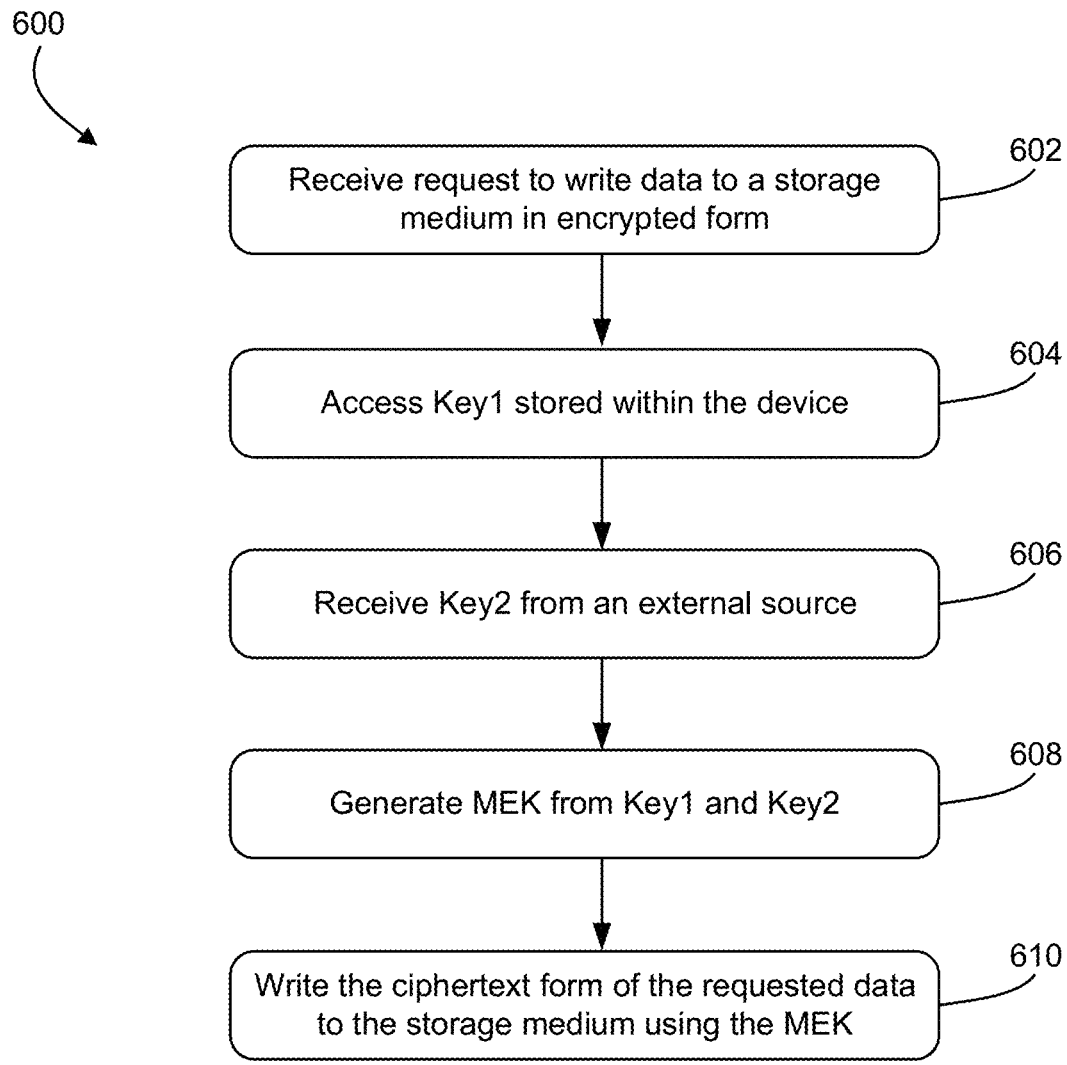
FIG. 6 is a flowchart of a method, in accordance with one aspect of the present invention.

Now referring to FIG. 6, a flowchart of a method 600 is shown according to one approach. The method 600 may be performed in accordance with the present invention in any of the environments depicted in the other FIGS. described herein, among others, in various approaches. For example, method 600 may have or incorporate similar features as those presented above in relation to FIG. 4, and in some aspects, a device may be enabled to perform the operations of FIGS. 4 and 6. Of course, more or fewer operations than those specifically described in FIG. 6 may be included in method 600, as would be understood by one of skill in the art upon reading the present descriptions.

Each of the steps of the method 600 may be performed by any suitable component of the operating environment. For example, in various approaches, the method 600 may be partially or entirely performed by a computer, a drive, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where a device, that is configured to perform data operations on a storage medium such as reading and/or writing data from/to the storage medium, receives a request to write data to the storage medium in encrypted form. The request may simply request writing of the data, or may include additional information such as Key2 (see below).

In operation 604, a first key (Key1) stored within the device is accessed, e.g., from a memory of the device, from an ASIC, etc. As noted above, in some approaches, the first key is stored in the device in raw (unencrypted) from. In other approaches, the first key is stored in the device in wrapped form (obfuscated form e.g., encrypted form, password protected form, etc.). Information such as another key, a password, etc. for unwrapping the first key may be received and used to unwrap the first key.

In preferred aspects, the device is configured to prohibit transfer of the first key to outside of the device. However, a controller internal to the device may access the first key within the device.

In operation 606, a second key (Key2) is received from an external source. The external source may be any external source. For example, the external source may be the requestor of the data, a key store, a key server, a key input by a user e.g., via a keyboard, etc.

In operation 608, a media encryption key (MEK) is generated using the first and second keys. Any known technique may be used to create a MEK from the first and second keys, e.g. by XORing the first and second keys.

In operation 610, the encrypted form (i.e. ciphertext) of the requested data is written to the storage medium using the media encryption key, e.g., via conventional techniques. The storage medium may be any type disclosed herein, e.g., magnetic tape, magnetic disk, NVRAM, etc. Accordingly, the device may be any type of data storage device, e.g., tape drive, SSD, HDD, encryption-capable USB drives, NVRAM modules, etc.

Aspects of the various operations and components of FIG. 6 are preferably similar to those described above in the section describing FIG. 4, but may include features from any other section herein. Such aspects are presented by way of example only, and are not intended to be limiting. Moreover, such aspects may be combined in any way, in accordance with the plethora of possible approaches of the present invention.

Writing to Magnetic Recording Tape and Other Portable Memory

As noted above, in some approaches, encrypted data is stored on a non-volatile storage medium such as a magnetic recording media (e.g. tape, disk) or solid-state memory (e.g. NAND flash, NVRAM, etc.). Again, any of the operations, concepts, etc. presented above may be used in the present approaches.

Figure 7:
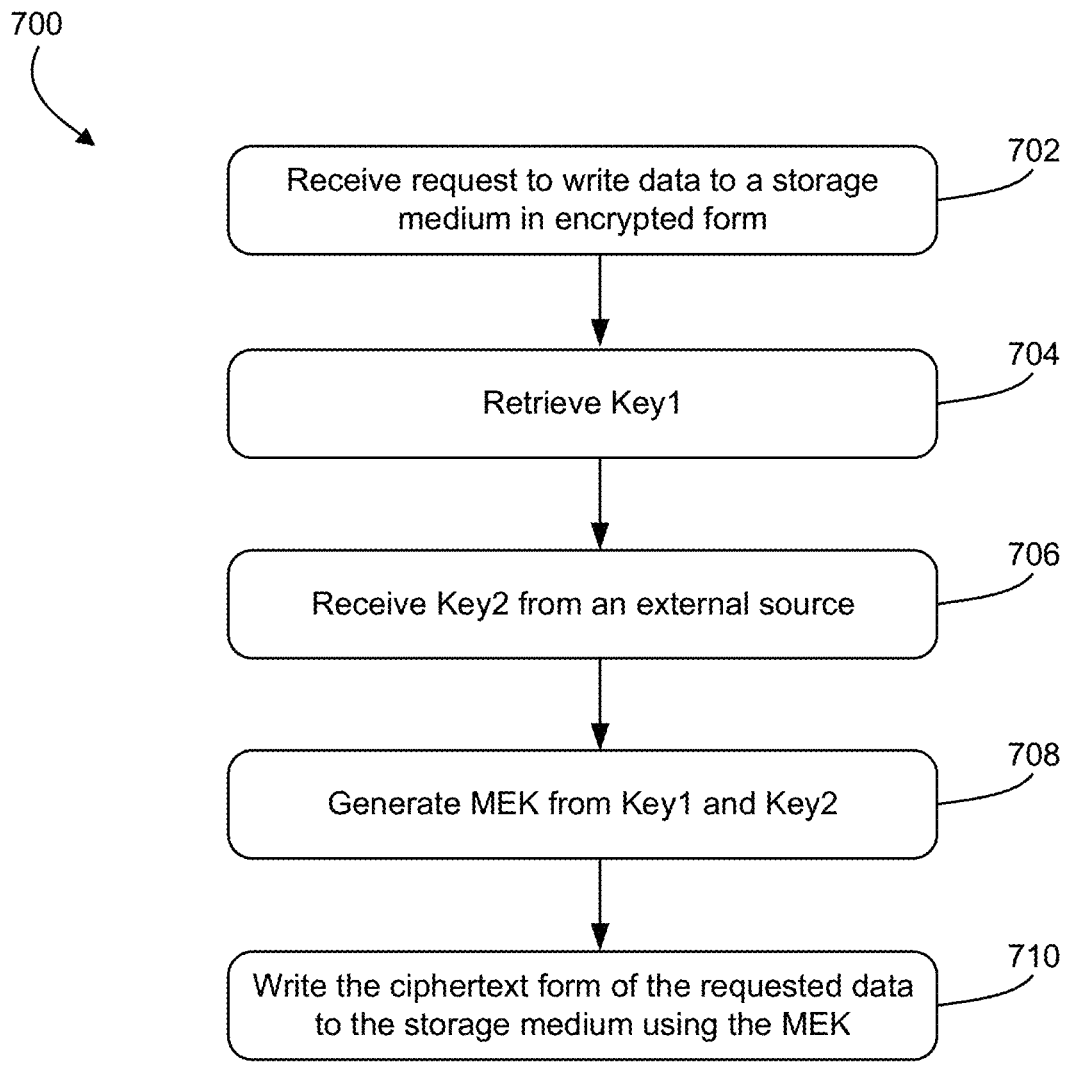
FIG. 7 is a flowchart of a method, in accordance with one aspect of the present invention.

Now referring to FIG. 7, a flowchart of a method 700 is shown according to one approach. The method 700 may be performed in accordance with the present invention in any of the environments depicted in the other FIGS. described herein, among others, in various approaches. For example, method 700 may have or incorporate similar features as those presented above in relation to FIGS. 4-5, and in some aspects, a device may be enabled to perform the operations of FIGS. 5 and 7. Of course, more or fewer operations than those specifically described in FIG. 7 may be included in method 700, as would be understood by one of skill in the art upon reading the present descriptions.

Each of the steps of the method 700 may be performed by any suitable component of the operating environment. For example, in various approaches, the method 700 may be partially or entirely performed by a computer, a drive, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7, method 700 may initiate with operation 702, where a device, that is configured to perform data operations on a storage medium such as reading and/or writing data from/to the storage medium, receives a request to write data to the storage medium in encrypted form. The request received may simply be a request to write the data, or may include additional information such as Key2 (see below).

In operation 704, a first key (Key1) stored on and/or with the storage medium is retrieved. This procedure may include retrieving the first key from the medium on which the data is stored, from a memory physically coupled to the medium such as a cartridge memory, and the like.

The storage medium may be any type disclosed herein, e.g., magnetic tape, magnetic disk, NVRAM, etc. Accordingly, the device may be any type of data storage device, e.g., tape drive, SSD, HDD, encryption-capable USB drives, NVRAM modules, etc.

As noted above, in some approaches, the first key is stored on and/or with the storage medium in raw (unencrypted) from. In other approaches, the first key is stored on and/or with the storage medium in wrapped form (obfuscated form e.g., encrypted form, password protected form, etc.). Information such as another key or PIN, a password, etc. for unwrapping the first key may be received and used to unwrap the first key.

In preferred aspects, the device is configured to prohibit transfer of the first key to outside of the device. However, a controller internal to the device may access the first key from the storage medium or other source that is coupled to the storage medium.

In operation 706, a second key (Key2) is received from an external source. The external source may be any external source. For example, the external source may be the requestor of the data, a key store, a key server, a key input by a user (e.g. via a keyboard, etc.).

In operation 708, a media encryption key (MEK) is generated using the first and second keys. Any known technique may be used to create a MEK from the first and second keys.

In operation 710, the requested data is written in ciphertext form to the storage medium using the media encryption key, e.g., via conventional techniques.

Aspects of the various operations and components of FIG. 7 are preferably similar to those described above in the section describing FIG. 5, but may include features from any other section herein. Such aspects are presented by way of example only, and are not intended to be limiting. Moreover, such aspects may be combined in any way, in accordance with the plethora of possible approaches of the present invention.

Systems according to various approaches include a device configured to perform data operations on a storage medium, the device having a processor and logic integrated with the processor, executable by the processor, or integrated with and executable by the processor, the logic being configured to cause the device to perform some or all of the foregoing operations, e.g. the operations of FIGS. 4-7.

Computer program products for enabling and/or performing crypto-erase, according to various approaches, include a computer readable storage medium having program instructions embodied therewith, the program instructions executable by a device configured to perform some or all of the foregoing operations, e.g. the operations of FIGS. 4-7.

Exemplary Implementations

An illustrative process to protect an encryption-capable storage device, such as a Self-Encrypting Device (SED), in accordance with one approach, includes the following operations:
1. Generate a Key1, and store that Key1 internal to the storage device, in a secure fashion internal to the storage device. Typically, Key1 would never be stored in cleartext form in non-volatile memory.
2. Generate a Key2, and store that Key2 external to the storage device, and:
    A. If Key2 was created internal to the storage device, have Key2 retrieved from the storage device
    B. If Key2 was created external to the storage device, have that Key2 served, when required, to the storage device
3. The storage device uses Key1 and Key2 to calculate a Media Encryption Key (MEK)
4. The MEK is used directly or indirectly to encrypt data to create ciphertext, and to decrypt ciphertext to create cleartext An illustrative process after a power loss, or cold boot, to regain access to an encryption-capable storage device, such as a Self-Encrypting Device (SED), in accordance with one approach, includes the following operations:
1. Have Key2 served to the storage device
2. Access Key1 internal to the storage device, which may involve cryptographically unwrapping Key1, which may require Key2 as well as one or more access keys (e.g. PIN)
3. The storage device uses Key1 and Key2 to calculate a Media Encryption Key (MEK)
4. The MEK is used directly or indirectly to encrypt data to create ciphertext, and to decrypt ciphertext to create cleartext Process to Retire a Device or Secure a Stolen Device An illustrative process that may be performed when a storage device is to be retired, e.g., because its background error rate has gotten too large (e.g. which can happen because of too many write cycles), or perhaps because it "failed" and did not successfully complete some operation), in accordance with one approach, includes the following operations:
1. Send a command to the storage device instructing it to crypto-erase its Key1
2. Did the crypto-erase of Key1 complete successfully? If:
    Yes, the data encrypted under that MEK has been successfully crypto-erased
    in this case, while there is no need to destroy Key2, though this can also be done
    No, in this case one cannot trust that any crypto-erase has occurred:
    Destroy Key2 external to the storage device, and so crypto-erase the storage device by external means
    Power off or cold boot the storage device to assure that the storage device is not retaining a volatile image of a key Note that key deletion may also be done in opposite order, with Key2 being destroyed first, preferably with a subsequent attempt to delete Key1. An illustrative process in accordance with one approach, includes the following operations:
1. Destroy Key2 external to the storage device, and so crypto-erase the storage device by external means
2. Send a command to the storage device instructing it to crypto-erase its Key1
3. Did the crypto-erase of Key1 complete successfully? If:
    Yes, the data encrypted under that MEK has been successfully crypto-erased by destruction of Key1 and Key2
    Power off or cold boot the storage device to assure that the storage device is not retaining a volatile image of any key
    No, but Key2 external to the storage device has been destroyed, and so crypto-erase the storage device is effected by external means Note also that if a storage device is stolen, or was not crypto-erased before it was removed from the storage system and is then lost e.g., in transit to another location, since a crypto-erase of data by destruction of Key 1 is no longer possible, because one doesn't have physical access to the storage device, one must instead destroy Key2, which is possible even without physical access to the storage device.

FIG. 8 depicts an example of what is currently achievable without the invention while FIGS. 9 and 10 depict examples of what is achievable operationally with one or more approaches of the invention. The charts in FIGS. 8-10 are self-explanatory, and are presented by way of example only.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that aspects of the present invention may be provided in the form of a service deployed on behalf of a customer to offer service on demand.

The descriptions of the various aspects of the present invention have been presented for purposes of illustration, but are not intended to be exhaustive or limited to the approaches disclosed. Many modifications and variations will be apparent to those of ordinary skill in the art without departing from the scope and spirit of the described aspects. The terminology used herein was chosen to best explain the principles of the various approaches, the practical application or technical improvement over technologies found in the marketplace, or to enable others of ordinary skill in the art to understand the approaches disclosed herein.

What is claimed is:

1. A device-implemented method, comprising:
   receiving, at a device configured to perform data operations on a nonvolatile storage medium, a request to read data, the data being stored on the storage medium in encrypted form;
   accessing a first key stored within the device in a nonvolatile memory;
   receiving a second key from an external source;
   generating a media encryption key directly from the first and second keys;
   reading the encrypted form of the data from the storage medium;
   decrypting the encrypted form of the data using the media encryption key;
   outputting the decrypted data;
   receiving an instruction to crypto-erase the data;
   in response to receiving the instruction, attempting to delete, by the device, the first key by overwriting the first key to cause the data to be crypto-erased; and
   destroying the second key to ensure crypto-erasure of the data.

2. The device-implemented method of claim 1, wherein the first key is stored in the device in raw form, wherein the first key is created internal to the device, wherein the device is configured to prohibit transfer of the first key to outside of the device, wherein the first key has a same length as the media encryption key.

3. The device-implemented method of claim 1, wherein the first key is stored in the device in wrapped form, and comprising receiving information for generating a wrapper key, the wrapper key being for unwrapping the first key.

4. The device-implemented method of claim 1, wherein the device is configured to prohibit transfer of the first key to outside of the device.

5. The device-implemented method of claim 1, wherein the media encryption key is stored in the device in wrapped form; and comprising deleting, by the device, the wrapped media encryption key in response to receiving the instruction.

6. The device-implemented method of claim 1, wherein the nonvolatile memory is a different type of memory than the storage medium.

7. The device-implemented method of claim 1, wherein the device is a tape drive, wherein the storage medium is a magnetic recording tape.

8. The device-implemented method of claim 1, comprising receiving second data for storage on the storage medium, receiving a third key from a second external source, generating a second media encryption key using the first and third keys, encrypting the data using the second media encryption key, and writing the encrypted data to the storage medium.

9. A computer program product for enabling crypto-erase, performing crypto-erase, or enabling and performing crypto-erase, the computer program product comprising a computer readable storage medium having program instructions embodied therewith, the program instructions executable by a device configured to perform data operations on a storage medium to cause the device to perform the method of claim 1.

10. A system, comprising:
    a device configured to perform data operations on a storage medium, the device having a processor and logic integrated with the processor, executable by the processor, or integrated with and executable by the processor, the logic being configured to cause the device to perform the method of claim 1.

11. A device-implemented method, comprising:
    receiving, at a device configured to perform data operations on a storage medium, a request to read data, the data being stored on the storage medium in encrypted form;
    retrieving a first key stored on the storage medium, with the storage medium, or on and with the storage medium;
    receiving a second key from an external source;
    generating a media encryption key directly from the first and second keys;
    reading the encrypted form of the data from the storage medium;
    decrypting the encrypted form of the data using the media encryption key;
    outputting the decrypted data;
    receiving an instruction to crypto-erase the data;
    in response to receiving the instruction, attempting to delete, by the device, the first key; and
    destroying the second key to ensure crypto-erasure of the data.

12. The device-implemented method of claim 11, comprising deleting, by the device, the media encryption key in response to receiving the instruction.

13. The device-implemented method of claim 11, wherein the first key is stored in the device in wrapped form in nonvolatile memory that is a different type of memory than the storage medium.

14. The device-implemented method of claim 11, wherein the device is a tape drive, wherein the storage medium is a magnetic recording tape.

15. The device-implemented method of claim 11, wherein the device is configured to prohibit transfer of the first key to outside of the device.

16. The device-implemented method of claim 11, wherein the first key is stored on the storage medium, with the storage medium, or on and with the storage medium in raw form.

17. The device-implemented method of claim 11, comprising generating the first key in the device; and storing, by the device, the first key on the storage medium, with the storage medium, or on and with the storage medium.

18. The device-implemented method of claim 11, comprising receiving second data for storage on the storage medium, receiving a third key from a second external source, generating a second media encryption key using the first and third keys, encrypting the data using the second media encryption key, and writing the encrypted data to the storage medium.

19. A system, comprising:
a device configured to perform data operations on a storage medium, the device having a processor and logic integrated with the processor, executable by the processor, or integrated with and executable by the processor, the logic being configured to perform the method of claim 11.

20. A device-implemented method, comprising:
receiving, at a device configured to perform data operations on a storage medium, a request to write data to the storage medium in encrypted form;
accessing a first key stored in a nonvolatile memory within the device apart from the storage medium;
receiving a second key from an external source;
generating a media encryption key directly from the first and second keys;
writing the requested data to the storage medium in encrypted form using the media encryption key;
receiving an instruction to crypto-erase the data;
in response to receiving the instruction, deleting, by the device, the first key; and
destroying the second key to ensure crypto-erasure of the data.

21. The device-implemented method of claim 20, comprising generating the first key by the device, wherein the device is configured to prohibit transfer of the first key to outside of the device.

22. A system, comprising:
a device configured to perform data operations on a storage medium, the device having a processor and logic integrated with the processor, executable by the processor, or integrated with and executable by the processor, the logic being configured to cause the device to perform the method of claim 20.

23. A device-implemented method, comprising:
receiving, at a device configured to perform data operations on a storage medium, a request to write data to the storage medium in encrypted form;
retrieving a first key stored on the storage medium, with the storage medium, or on and with the storage medium, the first key having been generated by the device;
receiving a second key from an external source;
generating a media encryption key directly from the first and second keys;
writing the requested data to the storage medium in encrypted form using the media encryption key;
receiving an instruction to crypto-erase the data;
in response to receiving the instruction, attempting to delete, by the device, the first key; and
destroying the second key to ensure crypto-erasure of the data.

24. The device-implemented method of claim 23, wherein the device is configured to prohibit transfer of the first key to outside of the device.

25. A system, comprising:
a device configured to perform data operations on a storage medium, the device having a processor and logic integrated with the processor, executable by the processor, or integrated with and executable by the processor, the logic being configured to cause the device to perform the method of claim 23.

* * * * *